April 30, 1957 H. G. YETTER 2,790,369
DISK COULTER JOINTER APPARATUS
Filed Sept. 29, 1950 3 Sheets-Sheet 1

Harry G. Yetter
INVENTOR.

BY *[signatures]*
Attorneys

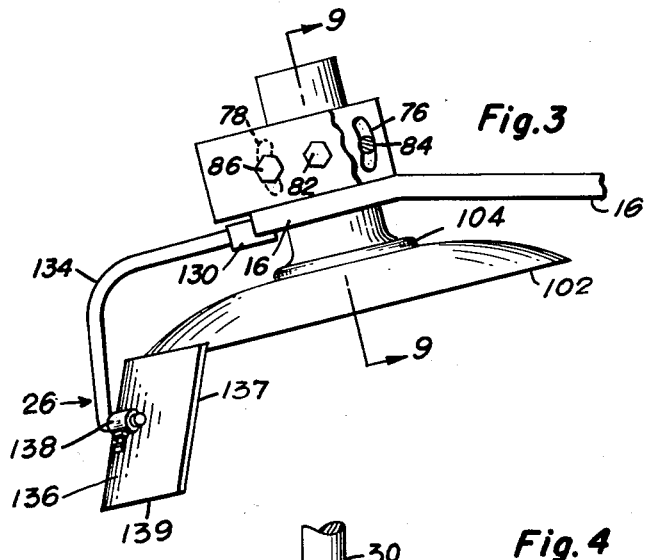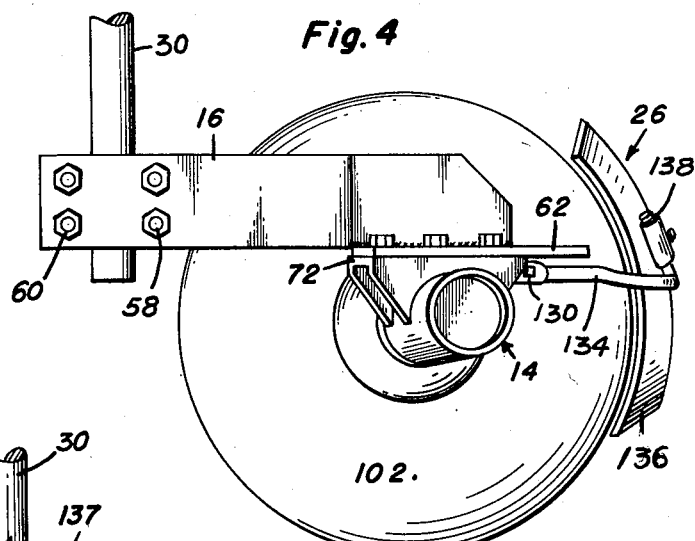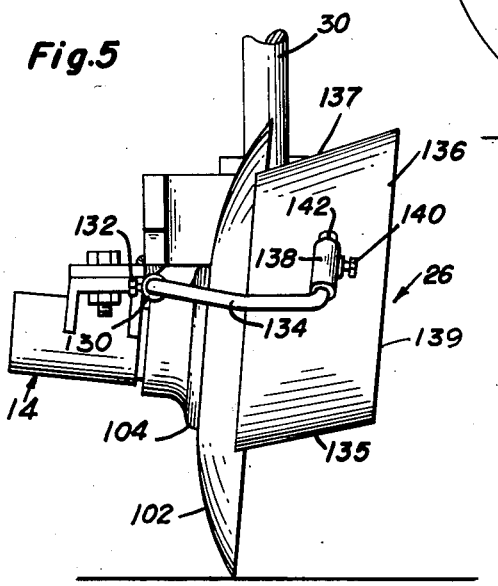

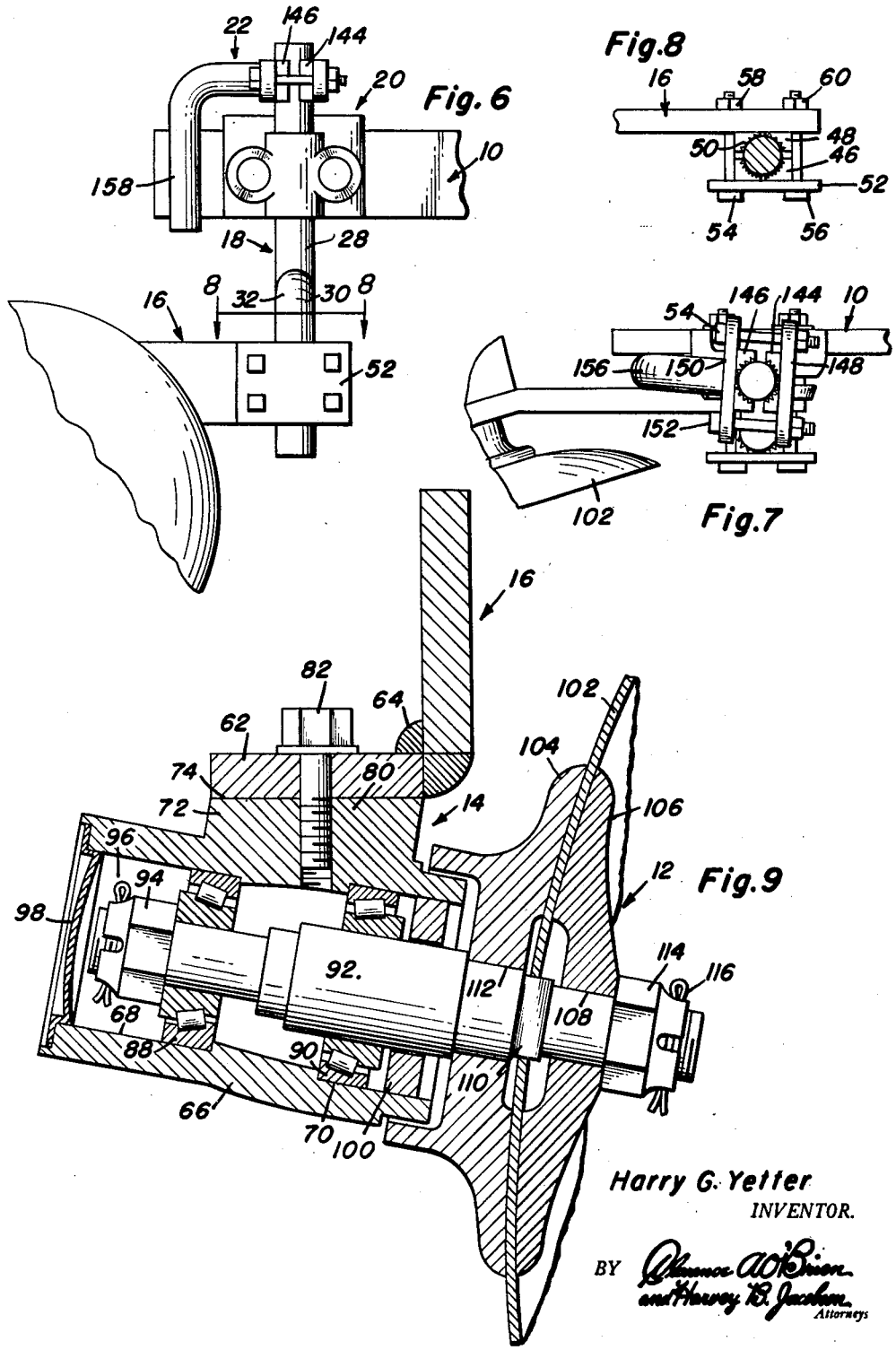

United States Patent Office 2,790,369
Patented Apr. 30, 1957

2,790,369

DISK COULTER JOINTER APPARATUS

Harry G. Yetter, Colchester, Ill.

Application September 29, 1950, Serial No. 187,581

3 Claims. (Cl. 97—210)

The present invention relates to improvements in apparatus for association with disk coulters and to means for mounting the disk coulter with respect to a plow beam or bar.

An object of the present invention is to provide a novel auxiliary attachment whereby the same may be attached to the coulter shank when slippage occurs between the coulter shank and the clamping means supporting the coulter shank on the plow beam.

A further object of the present invention resides in the provision of a novel means for securing the coulter bracket to the coulter shank whereby rotation of the coulter bracket with respect to the coulter shank is prevented and the bracket may be secured in any desired relation to the shank.

Still another object of the present invention resides in the novel cooperation between the bearing housing of the disk coulter and the bracket for supporting the bearing housing whereby the disk coulter may be angularly adjusted with respect to the bracket and coulter shank.

Still another object of the present invention resides in the provision of novel means for deflecting the turf from the periphery of the disk coulter whereby the same will cover the weeds and rubbish on the ground being turned.

Another object of the present invention resides in the provision of a novel deflecting plate which is adapted to be juxtaposed to the concave surface of the disk coulter for deflecting stones and turf therefrom.

A still further object of the present invention resides in the novel provision of means for pivotally supporting a deflector plate with respect to the bracket on the coulter shank whereby the same may pivot upwardly when struck by rocks or the like.

Still other objects of the present invention are to provide such means that are simple in construction, economical of manufacture, easily assembled and disassembled and of general serviceability.

Various other objects and advantages of the present invention will become apparent from the detailed description to follow. The best forms in which I have contemplated applying my invention are clearly illustrated in the accompanying drawings, wherein:

Figure 2 is a front elevational view of the structure of Figure 1 showing the deflector plate in its normal position and in dotted lines when the plate has been struck by a rock or the like;

Figure 3 is a top plan view of a portion of the structure of the present invention showing the means for pivotally adjusting the disk coulter with respect to the bearing housing and also showing a modified form of deflector plate for use in conjunction with the disk coulter;

Figure 4 is a rear elevational view of the structure of Figure 3;

Figure 5 is an end elevational view of Figure 4;

Figure 6 is a side elevational view of a portion of the present invention showing an auxiliary clamp for use in conjunction with the means for supporting the coulter shank on the plow beam whereby the coulter shank cannot rotate with respect to the plow beam;

Figure 7 is a top plan view of the structure of Figure 6;

Figure 8 is a horizontal transverse sectional view taken substantially along the plane of line 8—8 of Figure 6; and Figure 9 is a detail sectional view taken through the disk coulter assembly and the bearing housing for the disk coulter.

Figure 1:
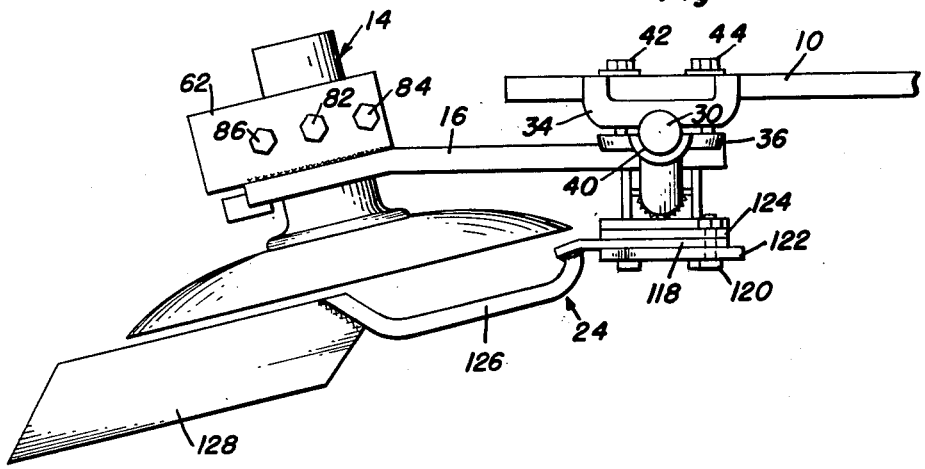
Figure 1 is a top plan view of the present invention showing one form of deflector plate mounted in juxtaposition to the disk coulter.

Referring more particularly to the drawings, wherein like numerals designate like parts throughout, the numeral 10 designates generally the plow beam or bar to which the disk coulter assembly 12, bearing housing 14, coulter bracket 16, coulter shank 18 and coulter shank attaching means 20 are secured for support. The numeral 22 designates generally the auxiliary clamp employed in conjunction with the structure of the present invention, while the numeral 24 designates the first form of deflector plate assembly and the numeral 26 designates generally the second form of deflector plate assembly for use in conjunction with the disk coulter 12.

The plow beam 10 is of conventional form, being rectangular in cross-section. The coulter shank 18 is also of conventional form, having a first upstanding portion 28, a second offset portion 30 in parallel relation to the upper portion 28 and a connecting portion 32. The coulter shank 18 is secured to the plow beam 10 by means of the bracket 20.

In looking at Figures 1 and 6, the bracket 20 will be seen to comprise a pair of clamping plates 34 and 36, each being provided with a semi-cylindrical recess, 38 and 40, respectively. Bolts 42 and 44 pass through the plow beam 10 and first clamping element 34 and are threadably engaged in the second clamping element 36 whereby the coulter shank 18 will be fixedly secured with respect to the plow beam 10.

Looking now at Figure 8, it will be seen that the means for securing the coulter bracket 16 to the coulter shank 18 is comprised of a pair of jaws 46 and 48 which are formed with serrated and substantially semi-cylindrical recesses 50 for engagement on the lower end 30 of the shank 18. The jaw 48 is integrally secured to the bracket 16 while the jaw 48 is secured to the plate 52. A pair of bolts 54 and 56 extend through the plate 52 and bracket 16 and have nuts 58 and 60 threadably engaged on their outer ends for clamping the jaws 46 and 48 to the coulter shank 18.

The outer end of the bracket 16 is provided with a right angularly extending plate 62 which is welded thereto at 64, as seen in Figure 9. Figures 4 and 9 show the bearing housing 14 as comprising a sleeve 66 having bores 68 and 70 therein and an extension plate 72 upwardly extending therefrom and of substantially U-shaped cross-section. The upper surface of the plate 72 is flattened as at 74 for positioning against the underside of the plate 62 of the bracket 16.

As seen best in Figure 3, the plate 72 is provided with a pair of elongated arcuated slots 76 and 78 and a central aperture 80 is provided for receiving the bolt 82. The bolt 82 extends through the plate 62 for fixedly securing the housing 14 with respect to the plate and bracket 16 as desired. Bolts 84 and 86 extend through the plate 62 and arcuated slots 76 and 78, nuts being provided on the underside of the plate 72 for threaded engagement on the shanks of the bolts 84 and 86 for fixedly securing the plate 72 to the plate 62 in their desired angular relation.

Referring once again to the bearing housing 14, it will be seen that a pair of anti-friction thrust bearings 88 and 90 are provided in the bores 68 and 70 for supporting the shaft 92 on the disk coulter assembly 12. A nut 94 is threaded on the outer end of the shaft 92 and abuts the inner ring of the bearing 88, with a cotter pin 96 extending through the outer end of the shaft 92. A dust cap 98 closes off the outer end of the bearing housing 14. The opposite end of the housing is substantially closed by means of the ring 100 which is press fitted into the bore 70.

The disk coulter assembly 12 is comprised of substantially conventional structure including the disk 102, clamping plates 104 and 106 on opposite sides of the disk 102, the disk and clamping plates being disposed on the stepped shaft 92 at 108, 110 and 112. A nut 114 and cotter pin 116 on the outer end of the shaft 92 complete the assembly.

Figure 2:
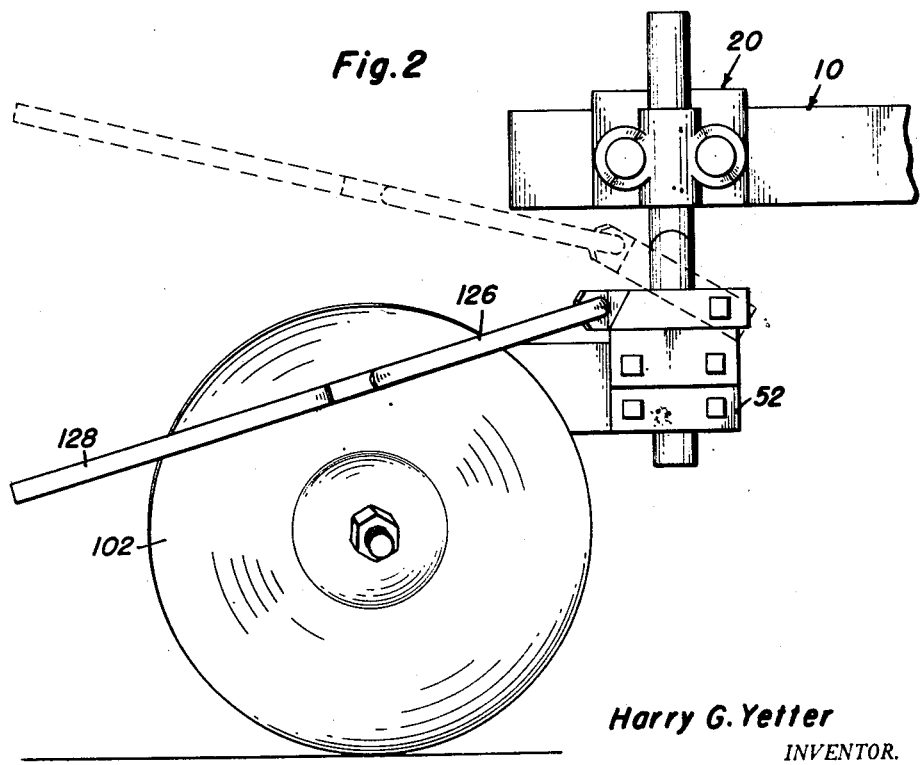

Figures 1 and 2 show a first form of deflector plate assembly 24 which includes a pivot mounting arm 118 which is pivotally mounted on the pin 120 extending through the pair of plates 122 and 124 which are secured to the plate 52 of the clamping means for securing the bracket 16 to the coulter shank 18. An arm 126 is welded to the outer end of the pivot element 118 and has its outer end integrally secured to the elongated deflector plate 128. The arm 126 and plate 128 lie substantially in the same plane and are in angulated relation to the pivot element 118 whereby the deflector plate will lie across the concave face of the disk 102. It will thus be seen that as the disk coulter travels at a high rate of speed through the ground, the turf and rocks which strike the deflector plate will deflect it to the position shown in dotted lines and will also cause the turf and rocks to be deflected onto the surrounding ground.

In the second form of deflector plate assembly 26 shown in Figures 3 through 5, an attaching sleeve 130 is integrally secured to the housing 14 and has a set screw 132 threadably engaged therein. An angulated arm 134 is slidably received within the sleeve 130 and adjusted in the desired angular relation by means of the set screw 132. The deflector plate 136 is similarly provided with a sleeve 138 having a set screw 140, the angulated end 142 of the arm 134 being slidably received within the sleeve 138 and secured in the desired angular relation by means of the set screw 140. The deflector plate 136 is of arcuated cross-section and is adapted to overlie the outer periphery of the disk 102 with the elements of the deflector plate extending substantially at right angles to the plane of the disk 102. The deflector plate leading edge 137 and trailing edge 135 extend angularly and upwardly with respect to the longitudinal edge 139 whereby the turf will not accumulate thereon.

It will readily be seen that the second form of deflector plate assembly 26 is particularly adapted for deflecting the centrifugally flying turf and rocks in an outward and downward direction from the disk coulter to cover the weeds and rubbish on the surrounding ground.

Looking now at Figures 6 and 7, the structure of the auxiliary clamp 22 will be described. The clamp 22 is comprised of a pair of clamping jaws 144 and 146 which are secured to the plates 148 and 150, the jaws being provided with serrated substantially semi-cylindrical recesses for engagement with the upper end of the coulter shank 18. Bolts 152 and 154 clamp the jaws to the coulter shank and one of the plates 150 has an outwardly extending angulated bar 156 integrally secured thereto. The downwardly extending angulated end 158 of the bar 156 is adapted to abut against the plow beam 10 to prevent rotation of the coulter shank. The auxiliary clamp 22 is particularly adapted for use when slippage begins to occur between the coulter shank 18 and the clamping means 20.

From the foregoing description taken in conjunction with the drawings it is believed that means have been provided which will accomplish all of the objects hereinabove set forth.

Having described the invention, what is claimed as new is:

1. A disk coulter assembly for high speed plowing comprising a coulter disk mounting assembly, a concave coulter disk journaled on said coulter disk mounting assembly and having an axis of rotation, an angulated arm, mounting means for mounting said arm on said coulter disk mounting assembly, a deflector plate carried by said angulated arm, said deflector plate overlying a portion of the periphery of said coulter disk and extending substantially in the direction of said axis outwardly of the concave side of said coulter disk, said deflector plate being disposed entirely rearwardly of radially adjacent portions of the periphery of said coulter disk and upwardly from said axis of said coulter disk and in the path of loose earth and trash thrown upwardly by said coulter disk in a plowing operation to deflect such earth and trash downwardly into a furrow formed by said coulter disk.

2. A disk coulter assembly for high speed plowing comprising a coulter disk mounting assembly, a concave coulter disk journaled on said coulter disk mounting assembly and having an axis of rotation, an angulated arm, a sleeve carried by said coulter disk mounting assembly, one end of said angulated arm being adjustably retained in said sleeve, a deflector plate carried by said angulated arm, said deflector plate having a deflector surface extending substantially in the direction of said axis outwardly of the concave side of said coulter disk, said deflector plate being disposed entirely rearwardly of radially adjacent portions of the periphery of said coulter disk with said deflector surface being disposed rearwardly of an axially corresponding portion of a surface generated by the axial projection of the periphery of said coulter disk and in the path of loose earth and trash thrown upwardly by said coulter disk in a plowing operation to deflect such earth and trash downwardly into a furrow formed by said coulter disk.

3. A disk coulter assembly for high speed plowing comprising a coulter disk mounting assembly, a concave coulter disk journaled on said coulter disk mounting assembly, an angulated arm, a sleeve carried by said coulter disk mounting assembly, one end of said angulated arm being adjustably retained in said sleeve, a deflector plate carried by said angulated arm, said deflector plate being arcuate and substantially conforming to the curvature of the periphery of said coulter disk, said deflector plate overlying a portion of the periphery of said coulter disk and being disposed outwardly of the concave side of said coulter disk, said deflector plate being disposed rearwardly and upwardly from the axis of said coulter disk and in the path of loose earth and trash thrown upwardly by said coulter disk in a plowing operation to deflect such earth and trash downwardly into a furrow formed by said coulter disk.

References Cited in the file of this patent

UNITED STATES PATENTS

| Number | Name | Date |
| --- | --- | --- |
| 507,312 | Daley | Oct. 24, 1893 |
| 795,430 | Danielsen | July 25, 1905 |
| 836,544 | Upton | Nov. 20, 1906 |
| 837,491 | Nelson | Dec. 4, 1906 |
| 941,191 | Ditmar | Nov. 23, 1909 |
| 1,076,871 | Davis | Oct. 28, 1913 |
| 1,101,411 | Cory | June 23, 1914 |
| 1,273,898 | Melvin et al. | July 30, 1918 |
| 1,555,881 | Schardt | Oct. 6, 1925 |
| 1,732,885 | Gilson | Oct. 22, 1929 |
| 1,765,143 | Fojtik | June 17, 1930 |
| 1,791,258 | Allen | Feb. 3, 1931 |
| 1,831,576 | Peterson | Nov. 10, 1931 |
| 2,244,774 | Hewitt | June 10, 1941 |
| 2,442,727 | Hyland | June 1, 1948 |